United States Patent [19]

Whatley et al.

[11] 4,150,883
[45] Apr. 24, 1979

[54] CINECONVERSION MACHINE

[75] Inventors: Thomas J. Whatley, Washington, D.C.; William M. Drennen, Jr., Great Falls, Va.

[73] Assignee: Comcorps Communication Corps Inc., Washington, D.C.

[21] Appl. No.: 814,771

[22] Filed: Jul. 11, 1977

Related U.S. Application Data

[63] Continuation-in-part of Ser. No. 613,798, Sep. 16, 1975, Pat. No. 4,035,067, which is a continuation-in-part of Ser. No. 543,952, Jan. 24, 1975, abandoned, which is a continuation of Ser. No. 297,241, Oct. 13, 1972, Pat. No. 3,867,022, which is a continuation-in-part of Ser. No. 92,315, Nov. 23, 1970, abandoned, which is a continuation-in-part of Ser. No. 866,240, Oct. 14, 1969, abandoned.

[51] Int. Cl.² ............................................. G03B 21/32
[52] U.S. Cl. ........................................ 352/87; 352/85; 352/89
[58] Field of Search ................ 352/87, 89, 85; 350/45

[56] References Cited

U.S. PATENT DOCUMENTS

| 2,068,829 | 1/1937 | Albada | 350/45 |
| 2,174,931 | 10/1939 | Terry | 352/87 |

Primary Examiner—Monroe H. Hayes
Attorney, Agent, or Firm—Karl F. Ross

[57] ABSTRACT

To record a composite picture on a film, a projection objective inserted between a movable transparency support and a pair of large-diameter planoconvex field lenses produces an aerial image of a slide, mounted on the support, in the region of the field lenses, preferably just beyond the more rewardly positioned field lens. A varifocal objective disposed to the rear of the field lenses has a stationary front component fully illuminated by the diverging light cones from all the points of the aerial image, this varifocal objective forming part of a zoom camera enabling the magnification ratio between the slide and its image on the camera film to be varied in a range of at least 6:1.

6 Claims, 3 Drawing Figures

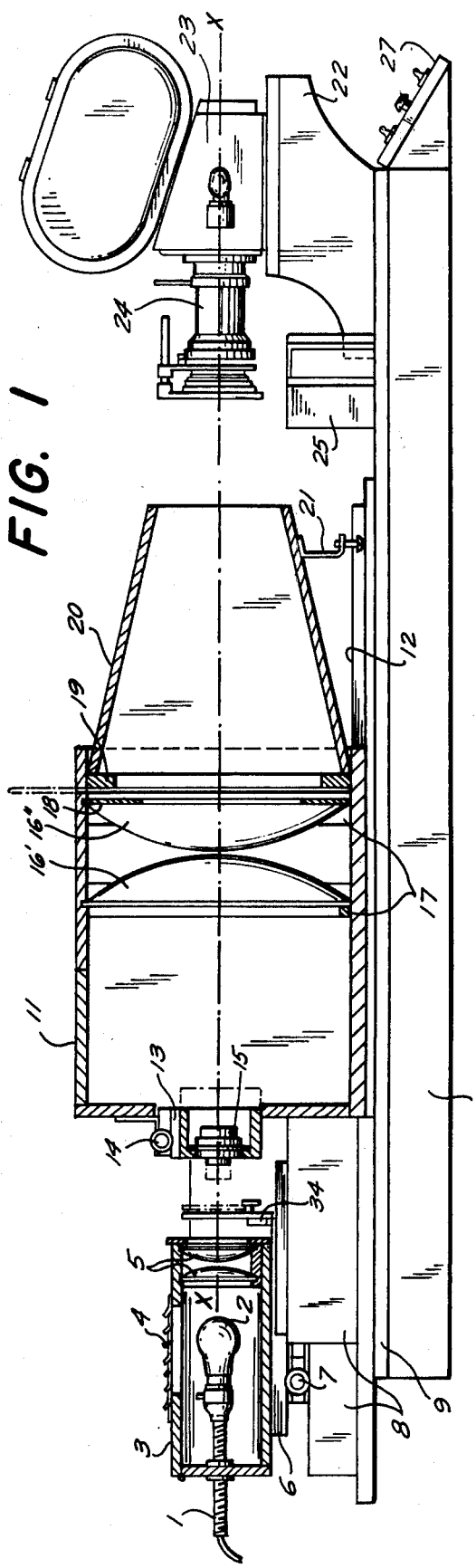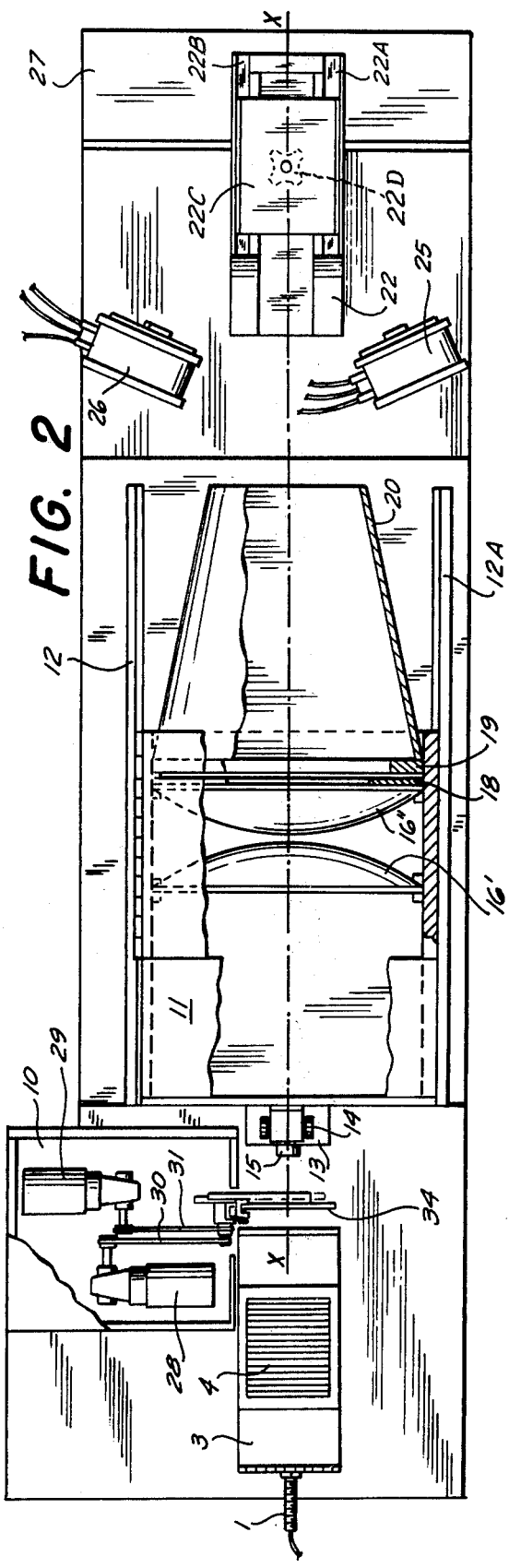

CINECONVERSION MACHINE

CROSS-REFERENCE TO RELATED APPLICATIONS

This application is a continuation-in-part of our copending application Ser. No. 613,798, filed Sept. 16, 1975 now U.S. Pat. No. 4,035,067 which was a continuation-in-part of our abandoned earlier application Ser. No. 543,952, filed Jan. 24, 1975 as a continuation of application Ser. No. 297,241, filed Oct. 13, 1972, now U.S. Pat. No. 3,867,022. The latter application, in turn, was a continuation-in-part of application Ser. No. 92,315, filed Nov. 23, 1970 as a continuation-in-part of application Ser. No. 866,240, filed Oct. 14, 1969, both now abandoned.

FIELD OF THE INVENTION

Our present invention relates to a cineconversion machine, i.e. to an optical system for the reproduction of a picture on a motion-picture film as part of a composite including, for example, an animated object providing foreground action against the background of the stationary picture.

BACKGROUND OF THE INVENTION

For this purpose it is known to mount the picture to be reproduced on a suitable support, such as a slide holder, forwardly of a projection objective which coacts with condensing lens means, such as a pair of large-diameter field lenses, to produce an aerial image of the picture in an intermediate plane. With the foreground action taking part in or near that intermediate plane, an objective of a motion-picture camera focused upon that plane films the composite scene.

It is frequently desirable to vary the magnification ratio of the image so recorded on the motion-picture film. This can seemingly be accomplished by simply replacing an ordinary, fixed-focus camera objective with an object of the varifocal or zoom type; attempts to realize significant variations in the magfication ratio by this expedient have, however, been unsuccessful in the past. For reasons not fully understood heretofore, satisfactory image brightness could be achieved only over a small fraction of the zoom range.

OBJECT OF THE INVENTION

The object of our present invention, therefore, is to provide a cineconversion machine with an improved optical system for reproducing a picture with a variable rate of magnification.

SUMMARY OF THE INVENTION

We have found, in accordance with our present invention, that the imperfections of prior systems of this character are due to an insufficient illumination of the front component of the varifocal camera objective by the light rays originating at the aerial image. In contradistinction to light rays emanating from a physical object, which propagate in all directions, those of an aerial image have a narrow spread limited by the generating lens system. With the system here discussed, each point of the aerial image gives rise to a diverging cone of light rays whose centerline intersects the optical axis at a point, common to all the light cones, which is the conjugate of the rear nodal point of the projection objective with reference to the field lens or lenses. It is only in an intermediate plane passing substantially through this common point that all the light cones intersect and illuminate a certain area determined by the vertex angles of the narrowest cones, i.e. those originating at the edge of the aerial image. Thus, for full illumination it is necessary that the front component of the varifocal camera objective have a forward lens member located in or near the plane where the area of coincidence of the intersecting light cones is a maximum and that this area of coincidence be large enough for full illumination of the entrance pupil. Since the illumination of the front component is unaffected by a diaphragm following that component, we are here concerned only with the natural entrance pupil independent of such diaphragm.

Although the natural entrance pupil of an objective is generally considered to be defined by its front component, this is strictly true for a zoom objective only in its telephoto position in which—with the usual four-component design—the axially shiftable, generally negatively refracting second component lies close to the the third and fourth components of the varifocal system. In the wide-angle position at the opposite end of the varifocal range, as well as in intermediate positions, the diverging rays exiting from the second component are partly cut off by the subsequent components which therefore determine the effective size of the entrance pupil in these positions. Thus, a bundle of light rays just filling the entrance pupil in a position of shorter focal length will not be sufficient to do so in position of larger focal lengths so that the images become unsatisfactory near the telephoto end of the range. By overfilling the entrance pupil throughout substantially the entire varifocal range, therefore, we insure satisfactory imaging over that range.

Such an overfill of the entrance pupil is obtained, in accordance with our invention, by so dimensioning the projection objective and the associated field lens or lenses that the diameter of any light cone in the aforementioned intermediate plane, originating at a point of the aerial image, is at least equal to the diameter of the front lens of the varifocal objective lying in that plane.

We have further found that the cutoff of incident rays in cetain positions of the varifocal system can be reduced by making that system positively refracting, rather than afocal as is usually the case. In the system of our prior application and U.S. Pat. No. 4,034,067 this was accomplished by splitting the stationary front component of the verifocal camera objective into two airspaced lenses or lens groups, i.e. a collimating lens means including the aforementioned forward lens member followed by preferably axially fixed converging lens means defining the entrance pupil. We now propose to eliminate the collimating lens means, claimed in our last-mentioned patent, whose effect can be duplicated by increasing the power of the first component of the four-component varifocal lens groups so that the light rays intercepted by the forward lens member (whose diameter usually exceeds those of the following lenses) will include only relatively small angles with the optical axis downstream of the shiftable second component and will therefore be able to reach, for the most part, the third and fourth components of the zoom objective.

BRIEF DESCRIPTION OF THE DRAWING

The above and other features of our invention will now be described in detail with reference to the accompanying drawing in which:

FIG. 1 is a longitudinal sectional view of a cineconversion machine embodying our invention;

FIG. 2 is a top plan view (parts broken away) of the machine shown in FIG. 1.

SPECIFIC DESCRIPTION

Figure 3:
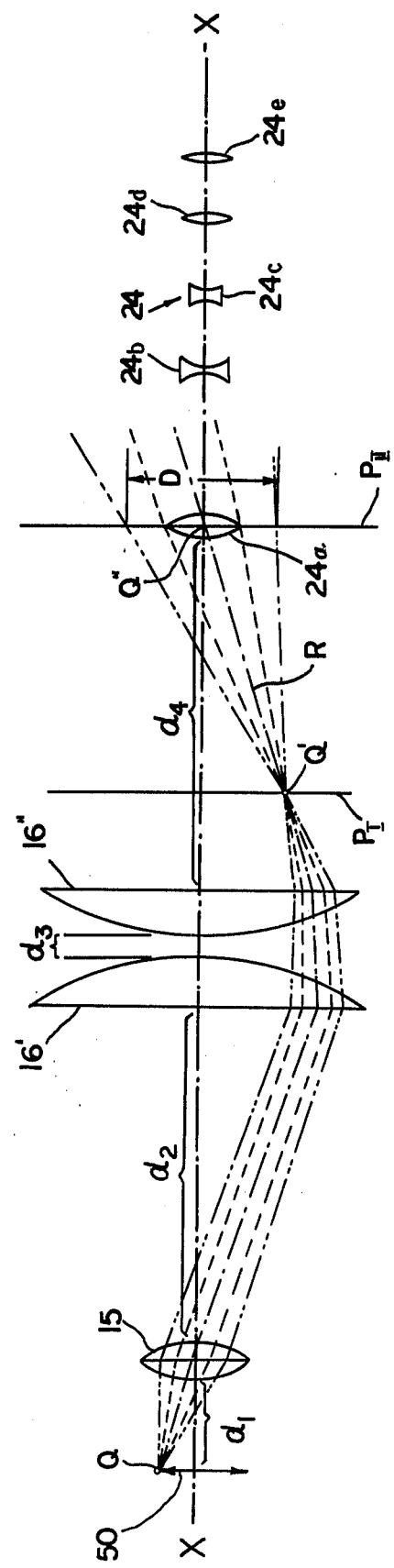
FIG. 3 is a diagrammatical view of the optical components of the system of FIGS. 1 and 2.

The apparatus shown in FIGS. 1 and 2 is identical with that illustrated in corresponding FIGURES of our prior applications Ser. Nos. 297,241 and 613,798, now U.S. Pat. Nos. 3,867,022 and 4,035,067. It comprises a light source 2, energized by way of a cable 1, in a housing 3 provided with louvres 4 for heat dissipation. A pair of condenser lenses 5 in housing 3 are centered on an optical axis X—X in line with a projection objective 15. Housing 3 is mounted on a rack 6 which, under the control of a pinion on a screw shaft 7, can be shifted along the axis. Lenses 5 are not critical for the operation of the system and may be replaced by a conventional diffuser such as an opal glass.

Screw shaft 7 is journaled in a base 8 carried on a bed 9 secured to a table 10 which may rest on any suitable support. Base 8 also carries a transparency holder or stand 34 which is interposed between housing 3 and projection objective 15 and which has a frame aperture centered on axis X—X. Objective 15 is supported in a lens mount 13 and can also be axially adjusted with the aid of a screw 14.

A larger housing 11, whose front wall accommodates the lens mount 13 with objective 15, surrounds a pair of planoconvex field lenses 16', 16" held in position by mounting rings 17. The field lenses, whose convex faces confront each other with a small air space in between, are of substantially larger diameter than the lenses of objective 15. Sliding frames 18 and 19, more fully illustrated in our U.S. Pat. No. 3,867,022, are juxtaposed with the planar rear face of the more rearwardly positioned field lens 16" to facilitate the interposition of a title-bearing plate or the like in the path of the light rays. As described in that patent, moving objects (e.g. goldfish in a bowl) can be similarly interposed at that location which, are more fully explained hereinafter, coincides with an intermediate plane wherein an aerial image of a slide held in transparency stand 34 is formed. A rearwardly converging extension 20 of housing 11 acts as a light shield and is adjustably supported on the bed 9 by a bracket 21. Rails 12 allows the housing 11 to be axially displaced.

A zoom camera 23 with a varifocal objective 24, also centered on axis X—X is supported on bed 9 by a mount 22 including a base 22C which is axially slidable along a pair of rails 22A, 22B and can be locked in position by a bolt 22C. A control panel 27 includes switches for displacing a slide in transparency holder 34, e.g. with the aid of a pair of timers 25 and 26, as likewise more fully described in our U.S. Pat. No. 3,867,022.

Reference will now be made to FIG. 3 showing diagrammatically a transparency 50 (held in the stand 34 of FIGS. 1 and 2) along with projection objective 15, condensing field lenses 16', 16", and varifocal objective 24. Objective 15 has been schematically represented by a single lens of positive refractivity.

The axial distances separating the elements 50, 15, 16', 16" and 24 from one another have been designated $d_1$, $d_2$, $d_3$ and $d_4$. In each instance the distance is measured to and from the nearest nodal point of the respective lens or lens group. Distance $d_1$ is somewhat greater than the focal length of objective 15 so that light rays emanating from a point Q on the edge of picture 50 converge slightly on their way to field lenses 16' and 16" which focus them onto a point Q' forming part of an aerial image of slide 50 in an intermediate plane $P_I$.

Varifocal objective 24 is shown to comprise a positive, stationary front or first component 24a followed, in conventional manner, by axially shiftable negative second and third components 24b, 24c and a fixed positive fourth component 24d preceding a basic lens or lens group schematically indicated at 24e. Components 24a–24e may be of any known structure; an Angénieux objective of varifocal ratio 10:1 (e.g. with a focal length from 12 to 120 mm) has been found particularly suitable. By the same token, the projection objective 15 can be of conventional design; in the particular system here described it is assumed to have a focal length of 100 mm and a relative aperture of 2:1. This corresponds to an absolute aperture of 50 mm diameter.

Given below are representative values of distances $d_1$–$d_4$:

TABLE I

| | |
|---|---|
| $d_1$ | 115 mm |
| $d_2$ | 933 mm |
| $d_3$ | 51 mm |
| $d_4$ | 820 mm |

The more forwardly positioned field lens 16' is of somewhat larger focal length than the rearwardly positioned field lens 16"; the combined focal length of these field lenses is about 500 mm or, roughly, half the distance $d_2$ which is of the same order of magnitude as distance $d_4$. The following specific values are given by way of example:

TABLE II

| | radius of convex face | diameter | refractive index $n_d$ | focal length | thickness |
|---|---|---|---|---|---|
| lens 16' | 567 mm | 508 mm | 1.489 | 1140 mm | 67 mm |
| lens 16" | 501 mm | 406 mm | 1.528 | 947 mm | 54 mm. |

With this system the plane $P_I$ of the aerial image lies about 76 mm rearwardly of the planar face of field lens 16". The centerline R of a diverging light cone originating at image point Q', representing a principal ray of objective 15, intersects the optical axis X—X at a point Q" which lies in another intermediate plane $P_{II}$. Thus, the two intermediate planes $P_I$ and $P_{II}$ are about 744 mm apart.

Front component 24a (or its forward lens member), whose diameter is greater than those of the other lens members of zoom objective 24, is positioned at or close to the plane $P_{II}$ where the diameter D of any diverging cone of light rays, originating at plane $P_I$, exceeds or at least equals its own diameter. The varifocal group 24a–24d could be of the conventional afocal type but, advantageously, has its front component 24a more strongly positively refracting than is necessary for such afocality, i.e. has a power larger than that complementing the other components 24b, 24c, 24d to an afocal lens group, so that the zoom objective 24 sees the equivalent of a remote physical object located forwardly of plane $P_I$. The varifocal lens group or attachment 24a–24d can provide a focal-length ratio of 6:1 or more.

We claim:

1. An optical system for reproducing a picture with a variable rate of magnification, comprising:
    support means for a picture to be reproduced on a distant receiving surface;

a projection objective rearwardly of said support means with a forward focal point to the rear of said support means for forming an aerial image of said picture at a location remote from said projection objective;

condensing lens means of a diameter substantially exceeding that of said projection objective and of a focal length on the order of magnitude of the back-focal length of said projection objective positioned to intercept converging rays from said projection objective for locating said aerial image in a first intermediate plane proximal to said condensing lens means and training a diverging light cone from each point of said aerial image upon an optical axis common to said projection objective and said condensing lens means, each light cone having a centerline intersecting said axis in a common point conjugate to the rear nodal point of said projection objective;

holding means for supporting an interposed object at said first intermediate plane; and a varifocal objective centered on said axis rearwardly of said condensing lens means for projecting said aerial image along with an image of said interposed object with variable magnification rate upon a receiving surface to the rear thereof, said varifocal objective having a stationary front component including a forward lens member substantially located in a second intermediate plane passing through said common point in which the diameter of each light cone from said aerial image at least equals the diameter of said forward lens member whereby the natural entrance pupil of said varifocal objective is overfilled in substantially the entire varifocal range thereof.

2. An optical system as defined in claim 1 wherein said front component is positive and part of a four-component varifocal lens group, the lenses of the remaining components of said varifocal lens group having diameters smaller than that of said forward lens member.

3. An optical system as defined in claim 2 wherein said front component has a power larger than that required for complementing said remaining components to an afocal lens group.

4. An optical system as defined in claim 1 wherein said condensing lens means comprises a pair of axially spaced planoconvex lenses of substantially identical diameters with confronting convex surfaces.

5. An optical system as defined in claim 4 wherein the more rearwardly positioned planoconvex lens has a shorter focal length than the more forwardly positioned one.

6. An optical system as defined in claim 5 wherein said planoconvex lenses are separated from said projection objective by a distance sufficiently smaller than the back-focal length of said projection objective to locate said aerial image to the rear of said more rearwardly positioned planoconvex lens.

* * * * *